United States Patent [19]

Tateishi et al.

[11] Patent Number: 4,482,965
[45] Date of Patent: Nov. 13, 1984

[54] TAXIMETER WITH TARIFF DISPLAY MODE CONTROLLED BY REMOVABLE MEMORY ADDRESSABLE BY FARE RATE KEYS

[75] Inventors: Iwao Tateishi, Yamatokoriyama; Takemi Mizuta, Osaka; Tatuo Yokoyama, Yamatokoriyama; Nobuyasu Kakutani, Nara, all of Japan

[73] Assignee: Sharp Kabushiki Kaisha, Osaka, Japan

[21] Appl. No.: 165,338

[22] Filed: Jul. 2, 1980

[30] Foreign Application Priority Data

Jul. 4, 1979 [JP] Japan ............................. 54-85461
Jul. 5, 1979 [JP] Japan ........................... 54-93116[U]
Aug. 30, 1979 [JP] Japan ............................. 54-111219

[51] Int. Cl.³ .................. G07B 13/00; G07B 13/10
[52] U.S. Cl. ........................... 364/467; 235/30 R; 235/45; 377/20; 377/24; 377/26; 364/900
[58] Field of Search ............ 364/467, 708, 900; 346/15, 16; 235/30 R, 33, 45, 92 TC, 92 CP, 92 R, 92 MT, 92 PE, 92 DN, 92 DM; 377/19, 20, 24, 26, 30

[56] References Cited

U.S. PATENT DOCUMENTS

| 3,843,874 | 10/1974 | Kelch | 364/467 |
|---|---|---|---|
| 3,860,806 | 1/1975 | Fichter et al. | 364/467 |
| 3,860,807 | 1/1975 | Fichter et al. | 364/467 |
| 3,931,508 | 1/1976 | Kelch | 364/467 |
| 3,937,933 | 2/1976 | Warkentin | 364/467 |
| 3,953,720 | 4/1976 | Kelch | . |
| 3,983,378 | 9/1976 | Tammi | 364/467 |
| 4,001,560 | 1/1977 | Larsen | 364/467 |
| 4,167,040 | 9/1979 | Heritier et al. | 364/900 |
| 4,205,388 | 5/1980 | Steiner | 364/467 |
| 4,209,688 | 6/1980 | Kelch | 235/30 R |
| 4,240,146 | 12/1980 | Iles | 364/467 |

FOREIGN PATENT DOCUMENTS

| 444 | 1/1979 | European Pat. Off. | 364/467 |
|---|---|---|---|
| 2433970 | 2/1975 | Fed. Rep. of Germany | 235/30 R |
| 2,608,251 | 9/1977 | Fed. Rep. of Germany | 364/467 |
| 2822019 | 12/1978 | Fed. Rep. of Germany | 235/33 |
| WO80/02207 | 10/1980 | PCT Int'l Appl. | 364/467 |

Primary Examiner—Raulfe B. Zache
Assistant Examiner—A. E. Williams, Jr.
Attorney, Agent, or Firm—Birch, Stewart, Kolasch & Birch

[57] ABSTRACT

There is disclosed a new and useful taximeter which allows simple changes in tariff display conditions in various operating modes without any change or modification in circuit construction. The taximeter using a memory device removable from the taximeter body and containing lamp enabling and disabling information is capable of optionally setting tariff display conditions in respective ones of operating modes without reconstructing the circuit arrangement of the taximeter body.

5 Claims, 4 Drawing Figures

|  | t4 | t3 | t2 | t1 |
|---|---|---|---|---|
| A0 | 0 | 0 | 0 | 0 |
| A1 | 1 | 0 | 0 | 0 |
| A2 | 0 | 1 | 0 | 0 |
| A3 | 0 | 0 | 1 | 0 |
| A4 | 0 | 0 | 1 | 0 |
| A5 | 0 | 0 | 1 | 0 |
| A6 | 0 | 0 | 0 | 1 |
| A7 | 0 | 0 | 0 | 1 |
| A8 | 0 | 0 | 0 | 1 |
| A9 | 0 | 0 | 0 | 1 |
| A10 | 0 | 0 | 0 | 1 |
| A11 | 0 | 0 | 0 | 1 |
| A12 | 0 | 0 | 0 | 1 |
| A13 | 0 | 0 | 0 | 1 |
| A14 | 0 | 0 | 1 | 1 |

TAXIMETER WITH TARIFF DISPLAY MODE CONTROLLED BY REMOVABLE MEMORY ADDRESSABLE BY FARE RATE KEYS

BACKGROUND OF THE INVENTION

This invention relates to an electronic taximeter, and more particularly to an electronic taximeter which provides simple changes in tariff display conditions in various operating modes (as determined by an actuated tariff key and a prior actuated tariff key).

Tariff display conditions in an electronic taximeter are generally fixed with regard to various operating modes of the taximeter. For instance, "PAID" is displayed upon actuation of a paid key, "20% UP" upon actuation of a 20% up key and "OCCUPIED" upon actuation of an occupied key. There may be a need to change these tariff display conditions in the respective operating modes of the taximeter due to tariff system reforms. In this case, a problem persists with the prior art taximeter in that the circuit arrangement thereof must itself be reconstructed whenever such changes are necessary.

OBJECTS AND SUMMARY OF THE INVENTION

Accordingly, it is an object of the present invention to provide a new and useful taximeter which avoids the above discussed problem with the prior art device.

It is another object of the present invention to provide a taximeter which allows simple changes in tariff display conditions in various operating modes without any change or modification in circuit construction. In other words, a taximeter according to the present invention is capable of optionally setting tariff display conditions in various operating modes without reconstructing the circuit arrangement within the taximeter body.

BRIEF DESCRIPTION OF THE DRAWINGS

Other objects and many of the attendant advantages of the present invention will be readily appreciated as the same become better understood by reference to the following detailed description when, considered in conjunction with the accompanying drawings in which like reference numbers designate like parts throughout the figures thereof, and wherein.

DETAILED DESCRIPTION OF THE INVENTION

Figures 1, 3:
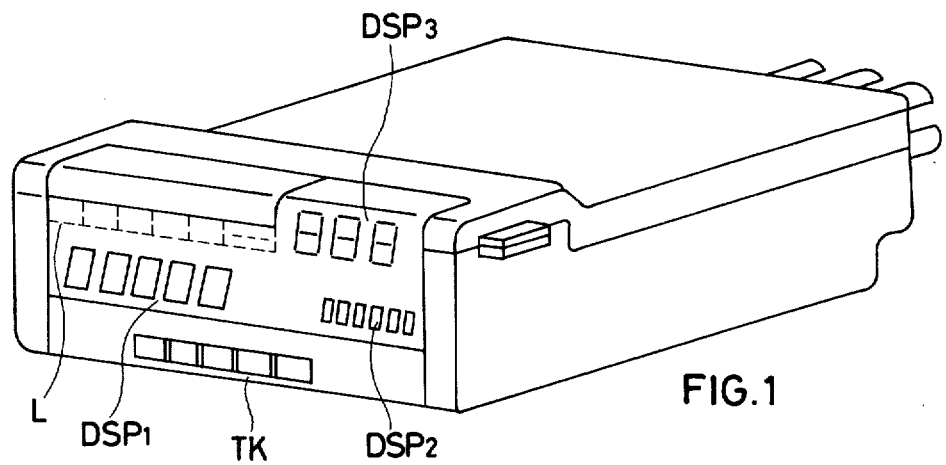
FIG. 1 is a perspective view of the appearance of an embodiment of the present invention.
FIG. 3 is a table indicating the relationship between address and information with regard to a memory removably fitted to the body of the taximeter shown and containing a succession of tariff display enabling and disabling signals.

Referring now to the accompanying drawings, there is shown a taximeter constructed in accordance with an embodiment of the present invention. In FIG. 1, there are provided a given number of tariff keys TK, a tariff display L, a fare display $DSP_1$, a cumulative value display $DSP_2$ and an extra fare display $DSP_3$. The cumulative value display $DSP_2$ may be adapted to provide a display of total traveled distance, service traveled distance, number of runs, number of additional runs, accumulated fare due, extra fare, etc.

Figure 2:
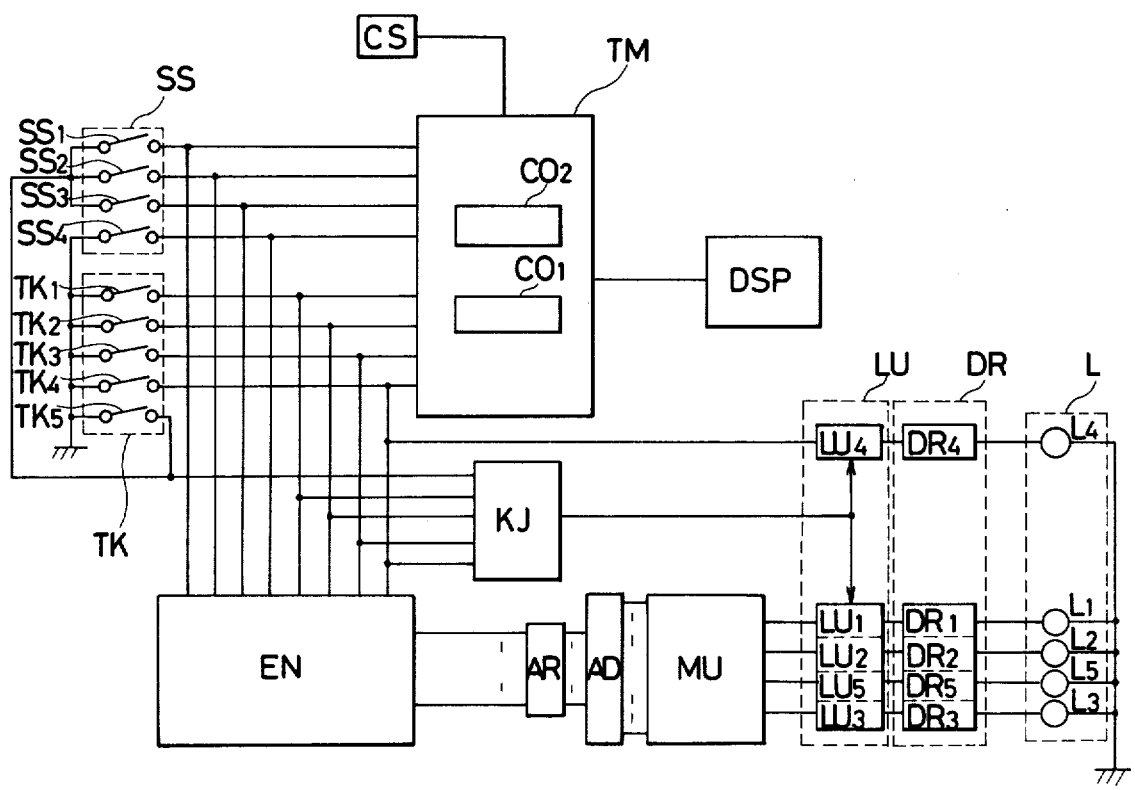
FIG. 2 is a schematic block diagram of an essential part of a circuit arrangement of the embodiment shown in FIG. 2.

In FIG. 2, the tariff keys TK include an occupied key $TK_1$, a 20% up key $TK_2$, a wait/paid key $TK_3$, a vacant key $TK_4$ and a system 3 key $TK_5$. There are further provided preset keys SS including a tariff system preset key $SS_4$. Depending on whether the preset key $SS_4$ is in the ON or OFF state, the taximeter shown herein is set in the distance meter system or combined time and distance meter system. When in the distance meter mode, the key $TK_3$ serves as a wait key, visually identified by a symbol reading "WAIT". On the other hand, while in the combined time and distance meter system, the key $TK_3$ behaves as a paid key with an attendant display of "PAID".

The remaining preset keys $SS_1$, $SS_2$ and $SS_3$ are switches that determine which of three fare rate modes system 3 falls into "30% UP", "INCREASED BASIS FARE" or "VACANT OR FREE FOR HIRE" mode. If $SS_1$ is turned ON and the rest remains OFF, then system 3 is set in the "30% UP" mode so that the system 3 key $TK_5$ serves as a 30% up key. If $SS_2$ is turned ON and other keys remain OFF, then system 3 falls into the "INCREASED BASIS FARE" mode. That is, in this case, the system 3 key $TK_5$ serves as an increased basis fare key. When $SS_3$ is in the ON state and the remaining switches are in the OFF state, system 3 belongs to the "VACANT OR FREE FOR HIRE" mode so that the system 3 key $TK_5$ functions as a vacant or free for hire key.

The definition of the key $TK_5$ is visually displayed based upon the operating mode as set up by the preset keys $SS_1$–$SS_3$ (for instance, a key legend "30% UP" is displayed when the system 3 key serves as the 30% up key) in the same manner as upon actuation of the preset key $SS_1$.

The above mentioned tariff display L includes a series of tariff lamps $L_1 \ldots L_5$ each corresponding to the respective tariff keys $TK_1 \ldots TK_5$. When $TK_3$ serves as the wait key, a front plate is illuminated with the tariff lamp $L_3$ to read "WAIT". When $TK_3$ serves as the paid key, the plate in front of the tariff lamp $L_3$ provides a visual display of "PAID". Likewise, when $TK_5$ is the 30% up key, the tariff lamp $L_5$ displays "30% UP". When $TK_5$ is the increased basis fare key, the tariff lamp $L_5$ displays "INCREASED BASIS FARE". When $TK_5$ services as the vacant or free for hire key, the lamp $L_5$ provides "VACANT OR FREE FOR HIRE".

FIG. 1 demonstrates the situation where the taximeter is placed in the combined time and distance meter system and system 3 is preset at the "30% UP" mode.

FIG. 2 shows a taximeter body TM including a distance counter $CO_1$, a fare counter $CO_2$, a revolution sensor CS, and the above discussed display DSP consisting of the fare display $DSP_1$, the cumulative value display $DSP_2$ and the extra fare display $DSP_3$. These components are well known in the art of taximeters with detailed disclosures thereof omitted herein.

The heart of the present invention will now be discussed in greater detail. A memory MU which contains a succession of tariff lamp enabling and disabling signals is fitted removably to the taximeter body. The detachable memory may be made up by a recently developed P-ROM, mask ROM or other components. The operation state of the respective tariff lamps $L_1 \ldots L_5$ upon actuation of the tariff keys TK is determined by information contained in the memory MU. As is well known in the art, the memory MU has an address counter AR and an address decoder AD. An encoder EN provides coded signals as address codes for the memory MU, depending on a particular actuated tariff key, the preset conditions by the preset switches and a prior tariff key acutuated just before actuation of that particular tariff key. An actuated key detector KJ develops its output only when any tariff key TK is actuated. Latches $LU_1$, $LU_2$, $LU_5$ and $LU_3$ hold and store information fetched from a particular address area of the memory MU as specified by the address codes from the encoder EN. Another latch $LU_4$ holds an output resulting from actuation of the vacant key $TK_4$. Being supplied with the output from the actuated key detector KJ, the latches LU ($LU_1 \ldots LU_5$) accept and hold their input signals. Lamp drive circuitry DR ($DR_1 \ldots DR_5$) enables or disables the tariff lamps $L_1 \ldots L_5$ in response to the outputs of the latches LU ($LU_1 \ldots LU_5$).

The taximeter will operate in the following manner as is better understood by reference to FIG. 3. TABLE 1 shows the relationship between the preset modes by actuations of the tariff keys TK and their corresponding addresses of the memory MU.

In TABLE 1, "VACANT" means the vacant or free for hire mode. TABLE 2 depicts the relationship between respective bits ($t_4 \ldots t_1$) and the respective tariff lamps.

TABLE 2

| BIT | TARIFF LAMP |
| --- | --- |
| $t_4$ | $L_1$ (occupied) |
| $t_3$ | $L_2$ (20% up) |
| $t_2$ | $L_3$ (system 3) |
| $t_1$ | $L_3$ (wait/paid) |

It is assumed that each of the tariff lamps is enabled with information "1" and disabled with information "O". The following example will give a better understanding of the taximeter according to the present invention. When the vacant key $TK_4$ is actuated to set up the vacant mode, the tarifff lamp $L_4$ is enabled to display "VACANT". In this case, the detector KJ senses that the vacant key $TK_4$ has been actuated and develops its output advising the latch $LU_4$ of that fact. As is clear from TABLE 1, all of the latches $LU_1$, $LU_2$, $LU_5$ and $LU_3$ are supplied with "0". As a result, the only latch in the set state is the latch $LU_4$ which in turn enables the tariff lamp $L_4$ through the lamp drive circuit $DR_4$, thus providing a visual display of "VACANT".

In the case where the shown taximeter operates as the distance meter with system 3 falling into the increased

TABLE 1

| MODE | (1) ACTUATED TARIFF KEY | (2) PRESET CONDITION BY SWITCH | (3) PRIOR ACTUATED TARIFF KEY | MEMORY MU ADDRESS |
| --- | --- | --- | --- | --- |
| VACANT | vacant key | | | $A_0$ |
| OCCUPIED (SYSTEM 1) | occupied key | | | $A_1$ |
| 20% UP (SYSTEM 2) | 20% up key | | | $A_2$ |
| 30% UP (SYSTEM 3) | system 3 key | SS1:ON SS2:OFF SS3:OFF | | $A_3$ |
| INCREASED BASIS FARE (SYSTEM 3) | " | SS1:OFF SS2:ON SS3:OFF | | $A_4$ |
| VACANT (SYSTEM 3) | " | SS1:OFF SS2:OFF SS3:ON | | $A_5$ |
| OCCUPIED/PAID | wait/paid key | SS4:OFF | occupied key | $A_6$ |
| 20% UP/PAID | " | " SS1:ON | 20% up key | $A_7$ |
| 30% UP/PAID | " | SS2:OFF SS3:OFF SS4:OFF | system 3 key | $A_8$ |
| INCREASED BASIS FARE /PAID | " | SS1:OFF SS2:ON SS3:OFF SS4:OFF | " | $A_9$ |
| VACANT/PAID | " | SS1:OFF SS2:OFF SS3:ON SS4:OFF | " | $A_{10}$ |
| OCCUPIED/WAIT | " | SS4:ON | occupied key | $A_{11}$ |
| 20% UP/WAIT | " | " SS1:ON | 20% up key | $A_{12}$ |
| 30% UP/WAIT | " | SS2:OFF SS3:OFF SS4:ON | system 3 key | $A_{13}$ |
| INCREASED BASIS FARE /PAID | " | SS1:OFF SS2:ON SS3:OFF SS4:ON | " | $A_{14}$ | basis fare mode, there is sometimes the need to set the wait mode in service (this is accomplished by actuating the wait key $TK_3$). At this time, the actuated key detector KJ produces its output signal, allowing the memory MU to deliver "0011" therefrom. The latches $LU_5$ and $LU_3$ are brought into the set state to enable the tariff lamps $L_5$ and $L_3$ whereas the other latches remain in the reset state. This indicates that the passanger vehicle is in the increased basis fare mode and also in the wait mode.

As note earlier, the taximeter embodying the present invention is given a greatest allowance in changes in the tariff displaying conditions because the enabling and diabling conditions of the tariff lamps in the respective operating modes are dependent and selectable by the information contained in the memory easily removable from the taximeter body. When the changing of the tariff display condtions becomes necessary, all that is needed is to replace the old memory MU with a new one (designed to accommodate to a new tariff rate regulation) or rewrite the contents of the memory MU via a simple measure. While, for example, the information shown in FIG. 3 is used in displaying the increased basis fare/wait modes by energizing both the increased basis fee tariff lamp and the wait tariff lamp, there is sometimes no requirement for indications of the two modes but a sole indication of the "WAIT" mode is enough even during the increased basis fare and wait modes. In this case, a new ROM (read only memory) which stores "0001" in the address $A_{14}$ may be available in place of the ROM illustrated in FIG. 3. In any case, a required change is attained not by reconstruction of the taximeter circuit but by easy exchange of the memory unit MU.

Figure 4:
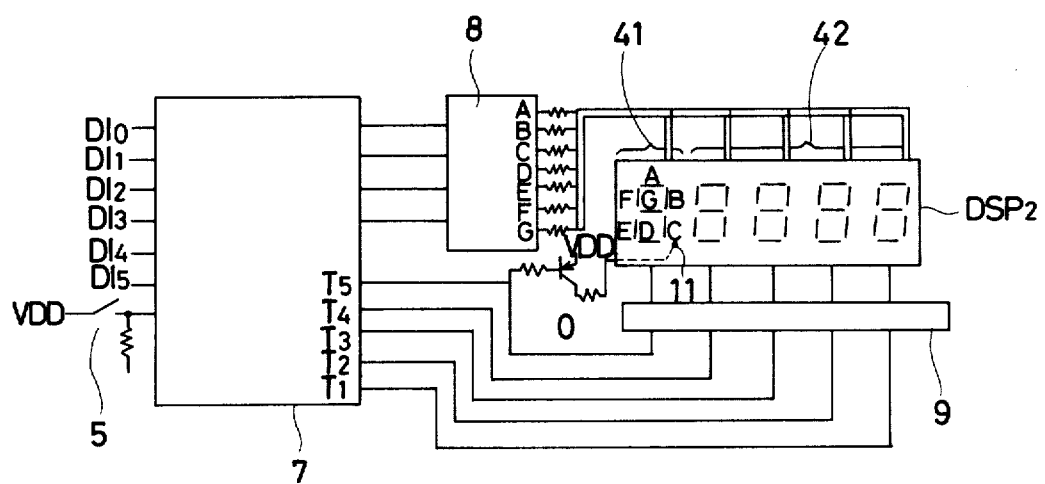
FIG. 4 is a schematic block diagram of address and cumulative value display sections.

FIG. 4 shows details of the cumulative value display $DSP_2$. As stated above, the cumulative value display can provide varied sorts of cumulative values calculated from the taximeter body, for example, total traveled distance, service traveled distance, number of service runs, number of additional runs, accumulated fare due, extra number, etc. The kind of these cumulative values may be identified by provision of an address display as follows:

TABLE 3

| ADDRESS DISPLAY | CUMULATIVE DATA |
|---|---|
| 0 | total traveled distance |
| 1 | service traveled distance |
| 2 | number of service runs |
| 3 | number of additional runs |
| 4 | accumulated fare |
| 5 | extra number |

The cumulative value display $DSP_2$ is made of a five digit cathode common LEDs (light emitting diodes) with the extreme left digit serving as an address display 41 and the remaining four digits as the main (cumulative value) display 42. Count circuitry 4 comprises a four digit, six channel accumulator counter (counting respective channel inputs $DI_0 \ldots DI_5$), an address counter incremented progressively in the order of $0 \rightarrow 1 \rightarrow 2 \rightarrow 3 \rightarrow 4 \rightarrow 5 \rightarrow 0 \rightarrow 1$ upon each actuation of an address up switch (preferably, mounted on the front panel of the taximeter) and a digit timing counter developing time-sharing digit selection signals $T_1 \ldots T_5$. Changeovers take place in the count circuitry 7 to select sequentially one of channels leading to its output line each time the address up switch is depressed. The contents of the address counter storing the contents of the selected channel and the cumulative data with respect to that selected channel are fetched in succession in synchronism with the time-sharing signals $T_1 \ldots T_5$. BCD codes from the count circuitry 7 are converted via a decoder driver 8 into anode segment selection signals compatible with the cumulative value display $DSP_2$. A second driver 9 develops cathode common selection signals based upon the time-sharing signals $T_1 \ldots T_5$.

An additional driver 10 which enables a decimal point LED 11 by supplying its output to tha cathode of the decimal point LED 11 is necessary for the practice of displaying the address and cumulative data. The cathode of the decimal point LED is common to the counterpart of the address display 41. The cumulative data display $DSP_2$ is driven on the time sharing basis and the decimal point LED 11 is enabled in timed relationship with the address display 41.

It is well known that the relationship between the number of revolutions of a transmission system and traveled distance differs from vehicle to vehicle due to the gear ratio of the transmission, the air pressure of tires, the diameter of tires, etc. For this reason the compensation by a so-called vehicle constant is necessary to accommodate measured distances displayed by the taximeter and actual traveled distances within a permitted range by regurations. When the compensation constant K is calculated using the shown taximeter, the vehicle is run by a predetermined distance (for example, b'=500 m) and the readout of the cumulative value display $DSP_2$ is then used for calculation of the vehicle constant K. Since the number n of pulses on the display $DSP_2$ and the number N of reference pulses per 1 Km, the vehicle constant K can be calculated from the following equation:

$$K = b'N/n$$

In view of the foregoing requirement, it is favorable that the cumulative counter be provided with a conventional zeroing device.

The invention being thus described, it will be obvious that the same may be varied in many ways. Such modifications are not to be regarded as a departure from the spirit and scope of the invention, and all such modifications are intended to be included within the scope of the following claims.

What is claimed is:

1. An electronic taximeter comprising:
    a fare calculation device within the body of said taximeter;
    a plurality of tariff keys for sending tariff information to said fare calculation device;
    a tariff display including a plurality of tariff condition displaying elements;
    a memory device fitted removably to said body of taximeter and containing tariff display enabling and disabling information associated with said respective tariff displaying elements;
    an address generator for generating an address signal corresponding to an actuated one of said plurality of tariff keys upon actuation thereof;
    an address circuit for specifying the address of said memory device in response to said address signal produced by said address generator; and
    means for enabling or disabling said tariff displaying elements according to said tariff condition enabling and disabling information recalled from a particular address area of said memory device as specified by said address signal;
    said memory device producing an enabling and disabling signal when said address circuit specifies the address in said memory device corresponding thereto;

said means for enabling and disabling including bistable latch means for driving said tariff display elements corresponding to the information contained in said enabling and disabling signal;

wherein said tariff displaying conditions responsive to actuation of said tariff keys are optionally selectable by exchange of said memory device or changes in the contents of said memory device.

2. An electronic taximeter as set forth in claim 1 further comprising a cumulative data display for displaying cumulative data developing within said taximeter.

3. An electronic taximeter as set forth in claim 2 wherein said cumulative data display further comprises second address display section for specifying the kind of cumulative data on said cumulative data display.

4. An electronic taximeter as set forth in claim 3 wherein said cumulative display is provided with a zeroing device.

5. An electronic taximeter as set forth in claim 1 wherein said display elements comprise light emitting diodes.

* * * * *